(12) United States Patent
Venkatraman et al.

(10) Patent No.: US 7,404,154 B1
(45) Date of Patent: Jul. 22, 2008

(54) BASIC CELL ARCHITECTURE FOR STRUCTURED APPLICATION-SPECIFIC INTEGRATED CIRCUITS

(75) Inventors: Ramnath Venkatraman, San Jose, CA (US); Michael N. Dillon, Richfield, MN (US); David A. Gardner, Sudbury, MA (US); Carl Anthony Monzel, III, Eagan, MN (US); Subramanian Ramesh, Cupertino, CA (US); Robert C. Armstrong, North Andover, MA (US); Gary Scott Delp, Rochester, MN (US); Scott Allen Peterson, Bloomington, MN (US)

(73) Assignee: LSI Corporation, Milpitas, CA (US)

( * ) Notice: Subject to any disclaimer, the term of this patent is extended or adjusted under 35 U.S.C. 154(b) by 302 days.

(21) Appl. No.: 11/189,026

(22) Filed: Jul. 25, 2005

(51) Int. Cl.
*G06F 17/50* (2006.01)
(52) U.S. Cl. .................... 716/2; 716/1; 716/5
(58) Field of Classification Search .............. 716/1, 716/2, 5; 257/240; 326/93, 103
See application file for complete search history.

(56) References Cited

U.S. PATENT DOCUMENTS

| | | | |
|---|---|---|---|
| 5,917,342 A * | 6/1999 | Okamura | 326/103 |
| 5,923,059 A | 7/1999 | Gheewala | |
| 5,977,574 A | 11/1999 | Schmitt et al. | |
| 6,166,560 A | 12/2000 | Ogura et al. | |
| 2002/0167334 A1 * | 11/2002 | Nakaizumi | 326/93 |

OTHER PUBLICATIONS

"Design Considerations for Regular Fabrics", Sherlekar, ISPD '04, Apr. 18-21, 2004, pp. 97-102.

* cited by examiner

*Primary Examiner*—Vuthe Siek
(74) *Attorney, Agent, or Firm*—Daffer McDaniel LLP (57) ABSTRACT

A basic cell circuit architecture having plurality of cells with fixed transistors configurable for the formation of logic devices and/or single/dual port memory devices within a structured ASIC is provided. Different configurations of ensuing integrated circuits are achieved by forming variable interconnect layers above the fixed structures. The circuit architecture can achieve interconnection of transistors within a single cell and/or across multiple cells. The interconnection can be configured to form basic logic gates as well as more complex digital and analog subsystems. In addition, each cell contains a layout of transistors that can be variably coupled to achieve a memory device, such as a SRAM device. By having the capability of forming either a logic circuit element, a memory device, or both, the circuit architecture is both memory-centric and logic-centric, and more fully adaptable to modern-day SoCs.

16 Claims, 8 Drawing Sheets

BASIC CELL ARCHITECTURE FOR STRUCTURED APPLICATION-SPECIFIC INTEGRATED CIRCUITS

BACKGROUND OF THE INVENTION

1. Field of the Invention

This invention relates to integrated circuits and, more particularly, to cell based integrated circuit architecture that is configurable for the formation of logic devices and/or single/dual port memory devices.

2. Description of the Related Art

The following descriptions and examples are not admitted to be prior art by virtue of their inclusion within this section.

An integrated circuit generally includes the interconnection of various circuit elements. Those circuit elements include transistors, resistors, capacitors, logic gates, flip-flops, registers, etc. In order to achieve functionality, the various circuit elements must be interconnected with attention given to where those elements are relative to each other. In particular, performance of an integrated circuit is affected by where the elements are connected and the interconnect length between elements. As such, optimal performance of circuit elements is generally dictated by the "layout" of the integrated circuit. Often, however, a tradeoff between performance and cost exists for layout considerations. For example, in an application-specific integrated circuit (ASIC), placement of elements and the interconnection therebetween is unique to that particular integrated circuit design. That is, layout is performed on a chip-by-chip basis and cannot be easily modified whenever a design change is needed for that particular product. An ASIC thereby enjoys the benefits of high performance, but also has a fairly high non-recurring recurring expense each time a design change is needed.

At the opposite end of the spectrum from ASIC designs is the more versatile gate array concept. A typical gate array consists of pre-designed circuit units or cells that are wired together to rapidly implement the final integrated circuit customer-specific functionality. The pre-designed circuit elements are called basic cells that, when interconnected, becomes the macro cell building blocks for the final integrated circuit product. The functionality of the final integrated circuit is thereby dictated by the interconnection of the macro cells. Gate array technology allows the pre-designed circuit unit to be fixed and need not change from one final circuit design to the next. In this manner, the design change can be implemented on the variable fabrication layers, yet the fixed layers will remain the same. Placement of interconnection that can vary depending on the intended circuit design adds configurability (or reconfigurability) to the gate array design. Thus, the concept of "fixed" and "variable" cell design of gate array technology offers a lower non-recurring expense if any design change is needed. Gate array technology generally allows changes to be made in the field to implement what is known as field-programmable gate arrays (FPGAs). FPGAs unfortunately have lower performance and higher power consumption relative to ASIC designs.

A special form of ASIC, known as structured or platform ASIC, serves somewhat as a compromise between FPGAs and standard ASICs. Similar to gate arrays, structured ASICs implement basic cells that are interconnected to form circuit elements. However, structured ASICs are not programmed in the field as in FPGAs, nor do structured ASICs consist of pre-designed circuit elements (e.g., logic gates, flip-flops, registers, etc.) that are wired together to form the integrated circuit. Instead, structured ASIC technology utilizes cells having a fixed pattern of transistors that are configurable for forming circuit elements with overlying variable interconnect layers. While structured ASICs have better performance and lower power consumption than gate arrays and have a lower non-recurring expense relative to standard ASICs, structured ASICs nonetheless have limitations as to what type of integrated circuit they can form. In particular, conventional structured ASICs are generally limited to forming logic circuits, such as NAND gates, NOR gates, etc. However, with the advent of greater integration and the use of system-on-chip (SoC) technology, modern designs mandate that the final integrated circuit contain more than just logic gates.

It would be desirable to implement a structured ASIC that can be reconfigured as logic gates, registers, flip-flops, and all other logic circuitry, as well as or in addition to memory. It would also be desirable to introduce a structured ASIC that can achieve a single port or dual port memory cell occupying a minimal amount of substrate space.

SUMMARY OF THE INVENTION

The problems outlined above may be in large part addressed by a basic cell circuit architecture having plurality of cells with fixed transistors configurable for the formation of logic devices and/or single/dual port memory devices within a structured ASIC. Different configurations of ensuing integrated circuits are achieved by forming variable interconnect layers above the fixed structures. The circuit architecture can achieve interconnection of transistors within a single cell and/or across multiple cells. The interconnection can be configured to form basic logic gates as well as more complex digital and analog subsystems. In addition, each cell contains a layout of transistors that can be variably coupled to achieve a memory device, such as a SRAM device. By having the capability of forming either a logic circuit element, a memory device, or both, the circuit architecture is both memory-centric and logic-centric, and more fully adaptable to modern-day SoCs. Moreover, the structured ASIC circuit architecture has the benefits of gate array technology with lower non-recurring expenses, yet benefits from higher performance and lower power consumption associated with standard ASIC technology. The following are mere exemplary embodiments of the circuit architecture described herein and are not to be construed in any way to limit the subject matter of the claims.

According to one embodiment, the circuit architecture includes a plurality of cells each comprising a first set of NMOS transistors and a second set of NMOS transistors having comparatively greater widths than the first set of NMOS transistors. In addition, a ratio of the average drive currents of the second set of NMOS transistors to the average drive currents of the first set of transistors is at least approximately 6.0.

In another embodiment, the circuit architecture includes a plurality of cells each having a fixed arrangement of transistors comprising a first set of NMOS transistors configured to function when coupled to overlying variable layers as either pass devices of memory circuitry or tri-state pass gates of some types of logic circuitry depending on the layout of the variable overlying layers coupled thereto. In addition, the fixed arrangement of transistors includes a second set of NMOS transistors having greater widths than the first set of NMOS transistors and which are configured to function when coupled to variable overlying layers as either pull down devices of memory circuitry or logic gates of logic circuitry depending on the layout of the variable overlying layers coupled thereto. The fixed arrangement of transistors further includes a first set of PMOS transistors configured to function when coupled to variable overlying layers as pull up devices of memory circuitry and also includes a second set of PMOS transistors configured to function when coupled to variable overlying layers as tri-state pass gates of some types of logic circuitry. Moreover, the fixed arrangement of structures includes a third set of PMOS transistors comprising greater widths than at least the first set of PMOS transistors and configured to function when coupled to variable overlying layers as logic gates of logic circuitry.

In yet another embodiment, the circuit architecture includes an arrangement of transistors comprising a first pair of gate lines spanning above an n-type diffusion region and two distinct p-type diffusion regions, wherein a width of one of the two p-type diffusion regions is smaller than a width of the other of the two p-type diffusion regions. The circuit architecture further includes a second pair of gate lines dividedly arranged in parallel and on opposing sides of the first pair of gate lines, wherein the second pair of gate lines span above portions of the p-type diffusion region with the larger width. Moreover, the circuit architecture includes a set of four gate lines arranged in parallel with the first pair of gate lines. The set of four gate lines span above extensions of the n-type diffusion region respectively arranged near opposing corners of the n-type diffusion region. The extensions comprise smaller widths than the portion of the n-type diffusion region below the first pair of gate lines.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Figure 1A:
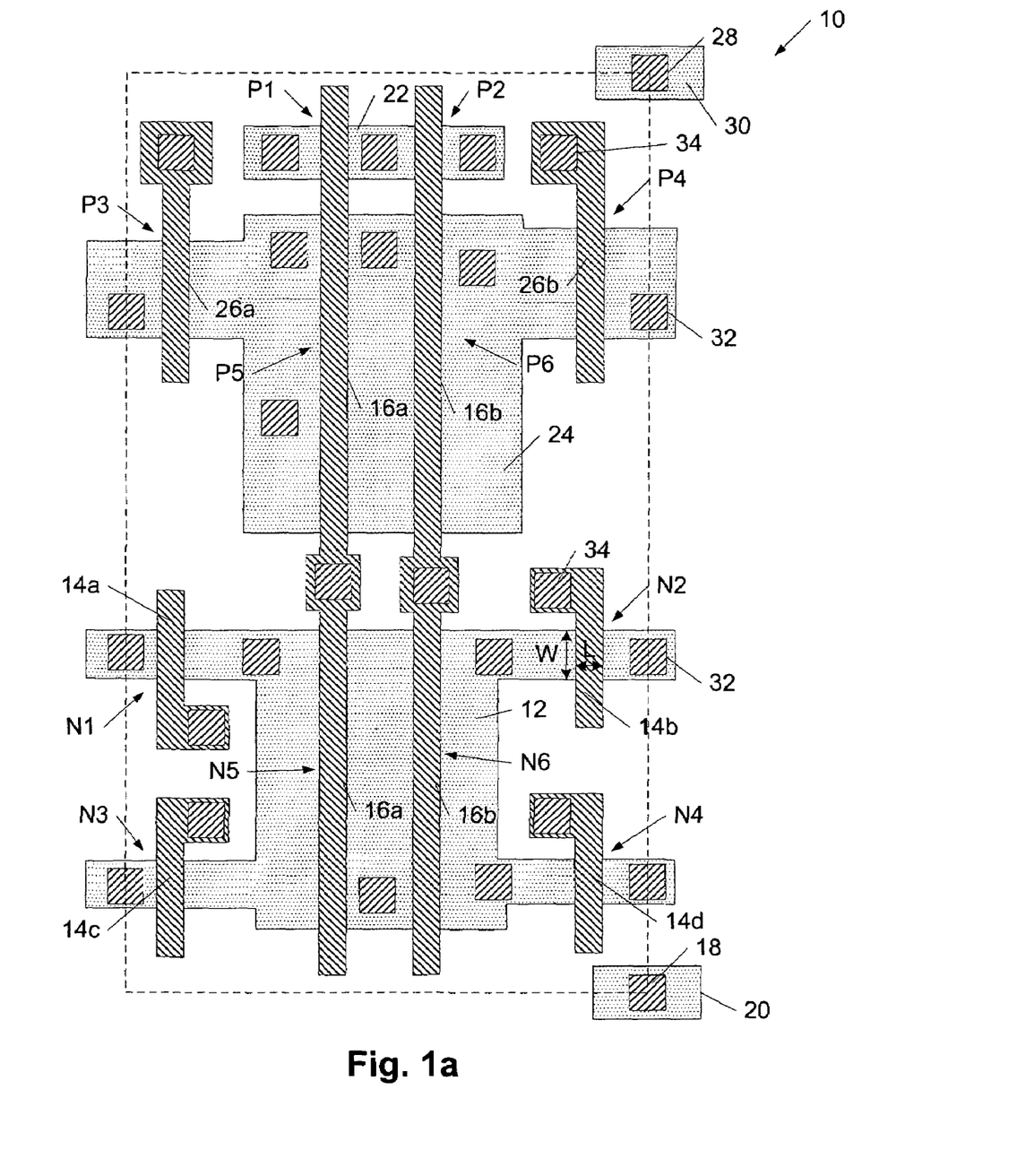
FIG. 1a depicts a top view of an exemplary basic cell architecture.

Turning to the drawings, FIG. 1a illustrates an exemplary plan view of basic cell architecture 10 having a plurality of transistors, which may serve as a repeatable base pattern of fixed layers for a structured ASIC. In particular, basic cell architecture 10 illustrates a layout of a plurality of transistors dimensionally configured and arranged such that when replicated within an array of cells, the plurality of cells form a building block for subsequent formation of logic circuitry and/or memory circuitry with overlying variable layers. The memory circuitry may include any memory technology that can receive written logic values and transmit read logic values that are stored in the interim, such as SRAM, DRAM or non-volatile technologies. The logic circuitry may include any logic circuitry, such as but not limited to NAND gates, NOR gates, XOR gates, AOIs, registers, and flip flops. As noted above, the fixed layers of structured ASIC do not change across a wafer and, thus, do not change across each diced integrated circuit. The fixed layers include all processing steps through and including the first metal layer. In particular, the formation of basic cell architecture 10 may begin with bare substrate or silicon and include implant, diffusion, deposition, etch, etc. cycles to form a plurality of gate lines and contacts extending downward to diffusion regions of the substrate as shown in FIG. 1a and described in more detail below. The variable layers are formed later in the fabrication sequence and differ depending on the final integrated circuit configuration.

As shown in FIG. 1a, basic cell architecture 10 includes six NMOS transistors and six PMOS transistors. In particular, basic cell architecture 10 includes NMOS transistors N1-N4 formed from gate lines 14a-14d and NMOS transistors N5 and N6 formed gate lines 16a and 16b, all of which are arranged over portions of n-diffusion 12. In addition, basic cell architecture 10 includes PMOS transistors P1-P2 and P5-P6 respectively disposed over p-diffusions 22 and 24 and formed from gate lines 16a and 16b. Furthermore, basic cell architecture 10 includes gate lines 26a and 26b disposed over portions of p-diffusion 24 for the respective formation of PMOS transistors P3 and P4. Although not necessarily so restricted, in some embodiments it may be advantageous to form gates lines 14a-14d, 16a-16b, and 26a-26b in the same direction to limit the variation of offsets which may be induced by the photolithography process. In addition, although basic cell architecture 10 illustrates gate line 14a in a different layout configuration than gate line 14c, the cell architecture is not so limited. In particular, gate line 14a may, in some embodiments, be laid out in the same manner as gate line 14c. As a result, gate line 14a may, in some cases, be a mirror image of gate lines 14b rather than a mirror image of gate line 14c as viewed along respective reference lines interposed between the gate lines. Alternatively, gate line 14a may, in some embodiments, be laid out in a configuration which is not a mirror image of any one of gate lines 14b-14d. In yet other cases, one or more of gate lines 14a-14d may be laid out in a different configuration than shown in FIG. 1a, including those which may or may not be mirror images of the other gates lines.

Power/ground contact to p-diffusions 22 and 24 and n-diffusion 12 may be made at n-well tap 28 and p-well tap 18 through diffusion regions 30 and 20, respectively. Additional contact to p-diffusions 22 and 24 and n-diffusion 12 may be made through contacts 32. Furthermore, basic cell architecture 10 may include contacts 34 to gate lines 14a-14d, 16a-16b, and 26a-26b. It is noted that the distinction among the illustration of contacts within FIG. 1a is that contacts 32 are shown from diffusion upward and contacts 34 are shown from gate line upward. The arrangement of contacts 32 and 34 are preferably configured with respect to the position of gate lines 14a-14d, 16-16b, and 26a-26b to control parasitic capacitance, maximize accessibility for the formation of memory or logic circuitry, and maximize circuitry density. In addition, NMOS transistors N1-N4 are formed of separate gates lines and are not connected to any other transistors to minimize wordline capacitance of ensuring memory circuitry. In general, gate lines 14a-14d, 16-16b, and 26a-26b, contact structures 32 and 34, and well taps 18 and 28 may include any material known for such structures in the semiconductor fabrication industry, such as but not limited to polysilicon, aluminum, copper, titanium, tungsten or any alloy of materials.

The periphery of basic cell architecture 10 is outlined in FIG. 1a to denote the arrangement of components therein. The dotted line, however, is not included within the circuit and, therefore, does not serve a function for the circuit. As shown in FIG. 1a, p-well tap 18 and n-well tap 28, diffusion regions 20 and 30, some of contacts 32, and portions of n-diffusion 12 and p-diffusion 24 may be formed along the periphery of basic cell architecture 10. Such placement may be indicative that the components are shared with adjacent cells. For example, each of taps 18 and 28 and diffusion regions 20 and 30 may be shared by four adjacent cells to allow a single contact to wells of four cells. In addition, n-diffusion 12 and p-diffusion 24 may extend into cells arranged on opposing sides of basic cell architecture 10 for the fabrication of transistors therein. Furthermore, some of contacts 32 may be shared among adjacent cells. Although such configurations may be advantageous for reducing the horizontal dimensions of basic cell architecture and the overall size of the array of cells, one or more of such components may not be shared among adjacent cells in some embodiments. In particular, each cell of an array may be formed with its own well taps, diffusion regions, and/or contact structures. In general, the horizontal and vertical dimensions of basic cell architecture 10 are an integral multiple of the routing grid used to size circuit structures, which is typically equal to the metal pitch offered for the particular layout technology. Exemplary horizontal and vertical dimensions for basic cell architecture 10 may be 7 routing grids and 14 routing grids, respectively, however, fewer or more routing grids may be employed.

In general, the width of a transistor, as used herein, may refer to the dimension of the transistor gate line portion extending directly over the diffusion region of the transistor specifically along the direction which the gate line extends over isolation regions bordering the diffusion region. On the contrary, the length of a transistor may generally refer to the dimension of the gate line extending between source and drain regions disposed within the transistor diffusion region. Hence, the length of a transistor may also be defined as the dimension of the gate line orthogonal to the transistor width. The orientations of width and length dimensions of NMOS transistor N2 are illustrated in FIG. 1a as W and L, respectively, and may be similarly applied to the other transistors of the cell architecture.

Although NMOS transistors N1-N6 and PMOS transistor P1-P6, or more specifically, gate lines 14a-14d, 16a-16b and 26a-26b are shown in FIG. 1a as having substantially similar lengths, the transistors are not necessarily so limited. In particular, any one or more of NMOS transistors N1-N6 and PMOS transistor P1-P6 may have a different length than the other of the transistors. In some instances, it may be desirable to fabricate NMOS transistors N1-N4 with a channel length larger than the minimum allowed channel length of the design rules and, thus, may be larger than the channel length of NMOS transistors N5-N6 and/or PMOS transistors P1-P6. This helps to reduce bit line leakage of memory devices. Also, by increasing the channel length of the smaller n-channel device, an improvement in the stability of the cell and a reduction in the variability of the bit line leakage can be accomplished. This is primarily due to the reduced variability with which larger channel lengths can be fabricated. Analysis can be done to determine how large to make the channel length in order to reduce bit line leakage on each bit line, yet not to significantly degrade the access times.

As shown in FIG. 1a, different sets of NMOS transistors N1-N6 and PMOS transistors P1-P6 include different widths. In particular, basic cell architecture 10 includes NMOS transistors N1-N4 having substantially smaller widths than NMOS transistors N5 and N6. In addition, PMOS transistors P1 and P2 have smaller widths than PMOS transistors P3 and P4, which in turn have smaller widths than PMOS transistors P5 and P6. As discussed in more detail below, such a variation of widths may provide configurability to basic cell architecture 10 for forming either logic devices or memory devices, depending on the layout of subsequently formed variable layers. In some embodiments, it may be advantageous for each of NMOS transistors N1-N4 to have substantially equal widths and/or for each of NMOS transistors N5-N6 to have substantially equal widths. In addition, it may be advantageous for PMOS transistors P1-P2, P3-P4, and/or P5-P6 within their respective sets to have substantially equal widths. Such configurations may insure the operational load incurred by subsequently formed logic or memory circuitry is substantially balanced among the similar width transistors. In other embodiments, the widths of the transistors within a respective set may not be substantially equal. Rather, the widths of transistors within a set may differ with a specific range, while still maintaining the grander scope of width variations among the different sets of transistors within basic cell architecture 10. For example, although NMOS transistors N1-N4 may not respectively include equal widths in some embodiments, the average widths of the transistors may be relatively smaller than the average widths of NMOS transistors N5-N6. A similar comparison may be made for PMOS transistors P1-P6 as well.

In addition to being characterized by width and length dimensions, a transistor may be characterized by the ratio of its width and length dimensions (hereinafter denoted as "W/L"), which in combination with threshold voltage, determines the drive currents or "strength" of the transistor. In some cases, it may be advantageous for transistors within the different sets of NMOS transistors N1-N6 and PMOS transistors P1-P6 to have substantially equal strengths to optimize the functionality of ensuing circuitry. For example, it may be advantageous for each of NMOS transistors N1-N4 to have substantially equal strengths and/or for each of NMOS transistors N5-N6 to have substantially equal strengths. In addition, it may be advantageous for PMOS transistors P1-P2, P3-P4, and/or P5-P6 within their respective sets to have substantially equal strengths. Since a given set of transistors are generally configured with same threshold voltage, substantially equal strengths may equate to substantially equal W/L ratios among the transistors of a set. Due to the size variation among the sets of transistors, however, the strengths among different set of transistors may differ. Exemplary strength ratios among NMOS transistors N1-N6 and PMOS transistors P1-P6 for basic cell architecture 10 are discussed in more detail below with regard to whether high dopant implants are incorporated into NMOS transistors N1-N4 (high threshold voltage dopant implant regions are shown and described in reference to FIG. 1b).

As noted above, the different sets of transistors among NMOS transistors N1-N6 and PMOS transistors P1-P6 may, in some embodiments, include substantially equal widths and, in other embodiments, slightly different widths. In conjunction with such embodiments and the desire to have substantially equal strengths among the set of transistors, the lengths of the transistors within the different sets of NMOS transistors N1-N6 and PMOS transistors P1-P6 may be same or differ as well. Given the variance of transistor widths and/or lengths among different sets of transistors, a variance of W/L dimensions may exist. For example, ratios of the average proportion of width versus length of PMOS transistors P1-P2 to the average proportion of width versus length of NMOS transistors N1-N4 may be between approximately 3.0 and approximately 4.0 in some cases. On the contrary, the ratio of the average proportion of width versus length of PMOS transistors P1-P2 to the average proportion of width versus length of NMOS transistors N1-N4 may be approximately 1.0 in some cases. For either of such comparisons, larger or smaller ratios may be employed for transistors of basic cell architecture 10.

The variation of strengths and, more specifically, widths among NMOS transistors N1-N6 and PMOS transistor P1-P6 may be particularly advantageous for providing configurability to basic cell architecture 10 for forming either logic devices or memory devices, depending on the layout of subsequently formed variable layers. In particular, the formation of relatively smaller transistors within basic cell architecture 10 may be advantageous for the formation of memory circuits since read, write and static noise margins are functions of pull-up transistor widths and pass device widths, the smaller of which produce higher margins. More specifically, the read margin of an SRAM cell is a function of the strength of the pull-down device compared to the pass device and the write margin is a function of the strength of the pass device in relation to the pull-up device. Furthermore, the static noise margin of an SRAM cell is a function of the ratio of the strength of the pull-down device to that of the pass device as well as the threshold voltage of the transistors. In addition to such a desirable functionality with small width transistors for memory circuitry, the small width transistors may advantageously lower the dynamic power of a flip flop, particularly when employed on the intercell clock nodes. Contrary to such a desirable functionality with small width transistors, however, logic gates and registers typically employ transistors of relatively larger widths. As such, basic cell architecture 10 may be used to form basic logic elements as well as memory cells.

For instance, NMOS transistors N1-N4 may be configured to function when coupled to overlying variable layers as either pass devices of memory circuitry or tri-state pass gates of some types of logic circuitry, such as flip-flops or standard logic multiplexers, for example. In other embodiments, NMOS transistors N1-N4 may not be coupled to overlying variable layers when basic cell architecture 10 is used for fabrication of logic circuitry and, therefore, may be idle. In addition, larger width NMOS transistors N5-N6 may be configured to function when coupled to variable overlying layers as either pull down devices of memory circuitry or logic gates of logic circuitry depending on the layout of the variable overlying layers coupled thereto. PMOS transistors P1-P2 may be configured to function when coupled to variable overlying layers as pull up devices of memory circuitry or, conversely, may not be coupled to overlying variable layers when basic cell architecture 10 is used for fabrication of logic circuitry and, therefore, may be idle.

In embodiments in which NMOS transistors N1-N4 functions as tri-state pass gates for fabrication of a flip-flop or a standard logic multiplexer, for example, PMOS transistors P3 and P4 may be configured to function as complementary tri-state pass gates of the flip-flop. For the fabrication of other logic circuitry or memory circuitry, however, PMOS transistors P3 and P4 may not be coupled to overlying variable layers and, therefore, may be idle. Moreover, larger width PMOS transistors P5-P6 may be configured to function when coupled to variable overlying layers as logic gates of standard logic circuitry. In some cases, larger width PMOS transistors P5-P6, in combination with smaller width PMOS transistors P1-P2, may provide additional drive in standard logic circuitry.

Furthermore, although larger width PMOS transistors P5-P6 may not be coupled to overlying variable layers for the formation of memory circuitry within basic cell architecture 10, the inclusion of such large transistors may increase the capacitance of the internal node with the memory circuitry as compared to a circuit not including such transistors. Such an increase in capacitance may advantageously prevent electron-hole pairs generated from ion strikes from perturbing drain node voltages and resultantly flipping the state of the device, reducing the occurrence of soft errors within the memory cell. In general, ion strikes can generate electron-hole pairs which travel along the path of a single energetic particle as it passes through the depletion region of memory cells where reverse biasing is applied between a drain region and well of a transistor. Sources of these ion strikes include alpha particles from radioactive materials and particles generated by neutrons from cosmic rays. Due to the rearrangement of charge carriers following an ion strike, a depletion region can collapse and, in turn, funneling from the depletion region can result from minority carrier flow through the substrate. As a consequence, the drain node voltage is perturbed and the state of the memory device may be flipped. High capacitance on the drain node, however, may advantageously prevent the collapse of the depletion region and, therefore, the inclusion of PMOS transistors P5-P6 may be particularly beneficial.

As is well known in semiconductor fabrication industry, threshold voltage magnitude $V_T$ of a transistor generally varies with the width of the transistor. In particular, the threshold voltage magnitude $V_T$ of a transistor separated by trench isolation structures may decrease as the width of the transistor decreases. Such a phenomenon is sometimes referred to as the inverse narrow width effect. In contrast, the threshold voltage magnitude of transistors separated by isolation regions fabricated from techniques other than trench isolation processes may increase as the width of the transistor decreases. A threshold voltage magnitude lower than its design value is undesirable because leakage current is typically increased as threshold voltage magnitude is decreased. Conversely, high threshold voltage magnitudes may have an undesirable effect on performance, namely the speed, of the circuit, particularly at low supply voltages. Therefore, it may be beneficial to maintain transistor threshold voltage magnitudes of within predetermined ranges.

Figure 1B:
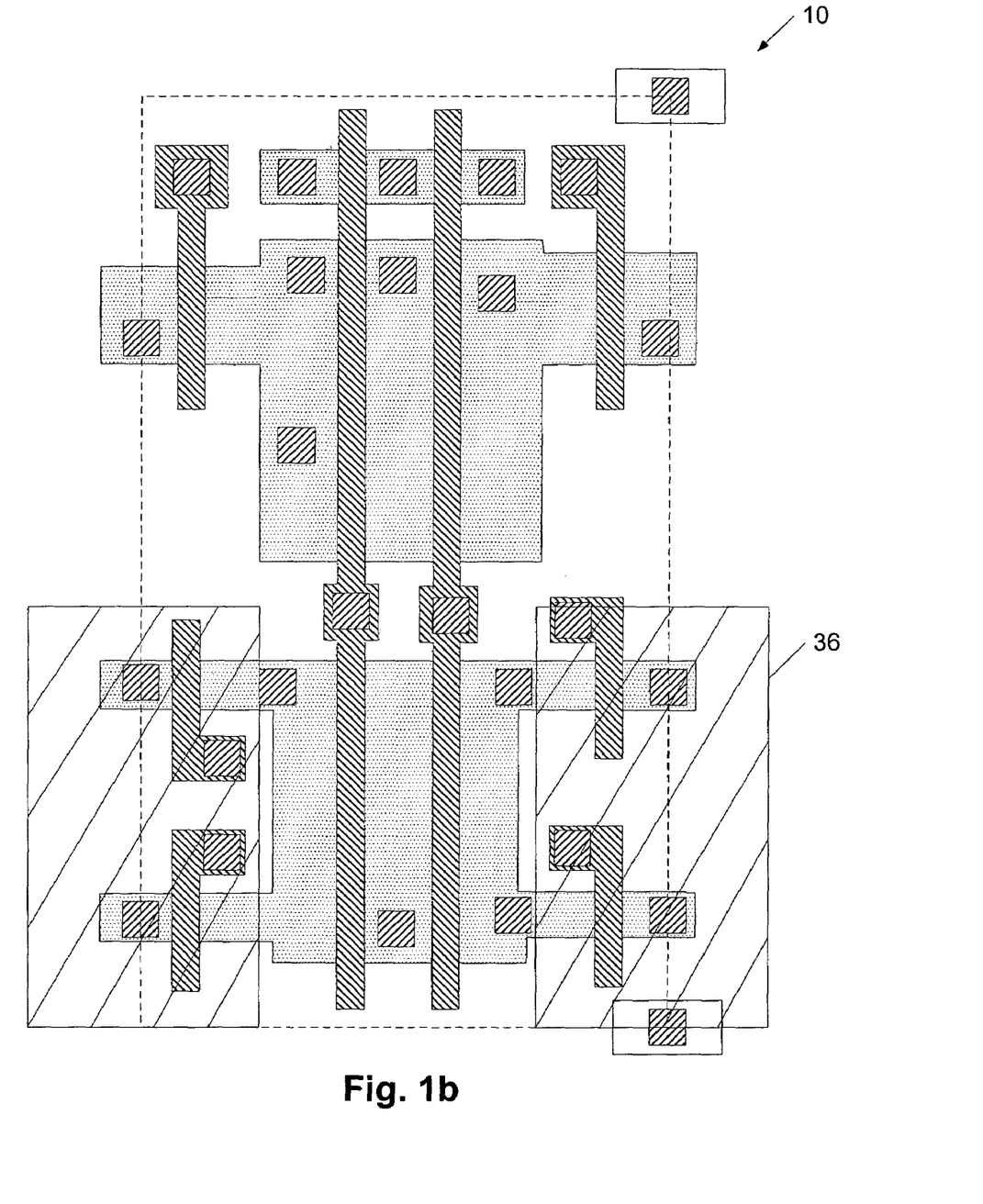
FIG. 1b depicts a top view of another exemplary basic cell architecture.

One method of adjusting the threshold voltage magnitude of a transistor is to implant a greater concentration of impurities into the channel dopant region of a transistor such that the channel region comprises a higher net concentration of electrically active dopants. For example, in embodiments in which basic cell architecture 10 includes trench isolation structures, additional n-type dopants may be implanted into the channel regions of NMOS transistors N1-N4 to increase the threshold voltage magnitudes of such small-width transistors. A configuration of basic cell architecture 10 including such high threshold voltage regions within NMOS transistors N1-N4 is shown in FIG. 1b by the inclusion of regions 36. Regions 36 may advantageously lower bitline leakage as well as increase read margin of an ensuing memory device. In addition, regions 36 may produce higher values of static noise margins.

A disadvantage of the inclusion of regions 36, however, is a reduction of cell current within the ensuing SRAM device, such as in the neighborhood of about 15%. This reduction in the cell current is the direct result of having reduced transistor drive currents (a.k.a., "strength") due to the presence of the high-Vt dopant implant. Such a cell current reduction may significantly reduce the speed of operation of some logic circuitry and, therefore, high voltage implants are not formed within the channel regions of NMOS transistors N5-N6 and PMOS transistors P5-P6. Rather, NMOS transistors N5-N6 and PMOS transistors P5-P6 may be formed of standard threshold voltage magnitude. It is noted that performance of some logic circuitry, such as flip-flops or standard logic multiplexers for example, is not affected by the reduction of transistor drive current and, therefore, the high voltage implants within NMOS transistors N1-N4 when they function as tri-state pass devices may not be undesirable. Although not necessarily so restricted, PMOS transistors P1-P4 may include standard threshold voltage magnitudes in some embodiments.

As a result of the higher voltage threshold imparted by regions 36, the ratio of drive currents of NMOS transistors N5-N6 to NMOS transistors N1-N4 (known as the beta ratio for SRAM devices) may be larger than when regions 36 are omitted from basic cell architecture 10. In particular, the ratio of drive currents of NMOS transistors N5-N6 to NMOS transistors N1-N4 may be between approximately 7.0 and approximately 8.0 when regions 36 are included in basic cell architecture 10. In contrast, the ratio of drive currents of NMOS transistors N5-N6 to NMOS transistors N1-N4 may be between approximately 3.0 and approximately 7.0, and more specifically, between approximately 6.0 and approximately 7.0 when regions 36 are not included in basic cell architecture 10.

Given such strength correlations, the widths of PMOS transistors P1-P2 and NMOS transistors N1-N4 may be approximately 200 nm or less, since such dimensions have shown to offer favorable read, write and static noise margins. Exemplary margins which may be considered favorable for read and write operations of some memory cells may be greater than approximately 20% and 30%, respectively. However, larger or smaller read and/or write margins may be employed, depending on the memory technology and design specifications of the device. In addition, PMOS transistors P5-P6 and NMOS transistors N5 and N6 may include widths as large as possible while generally minimizing the area occupied by basic cell architecture 10. PMOS transistors P3-P4 may generally, include widths in the range between the widths of PMOS transistors P1-P2 and P5-P6 or equal to either of such widths. In any case, NMOS transistors N1-N6 and PMOS transistors P1-P6 are preferably optimally sized to achieve the maximum possible electrical performance at the highest possible density while minimizing power of the ensuing device for both memory circuitry and logic circuitry. In light of such goals, it is noted that the dimensions of NMOS transistors N1-N6 and PMOS transistors P1-P6 are preferably not constrained to tight dimension specifications, but rather may generally obey the looser recommended specifications for Design of Manufacturability reasons. For example, the transistors may be susceptible to dimension variations resulting from rounding and misalignment in photolithography. Physical design rules such as gate line end-cap and distance of the "L" shaped gate line to diffusion are kept especially broad.

Figure 2:
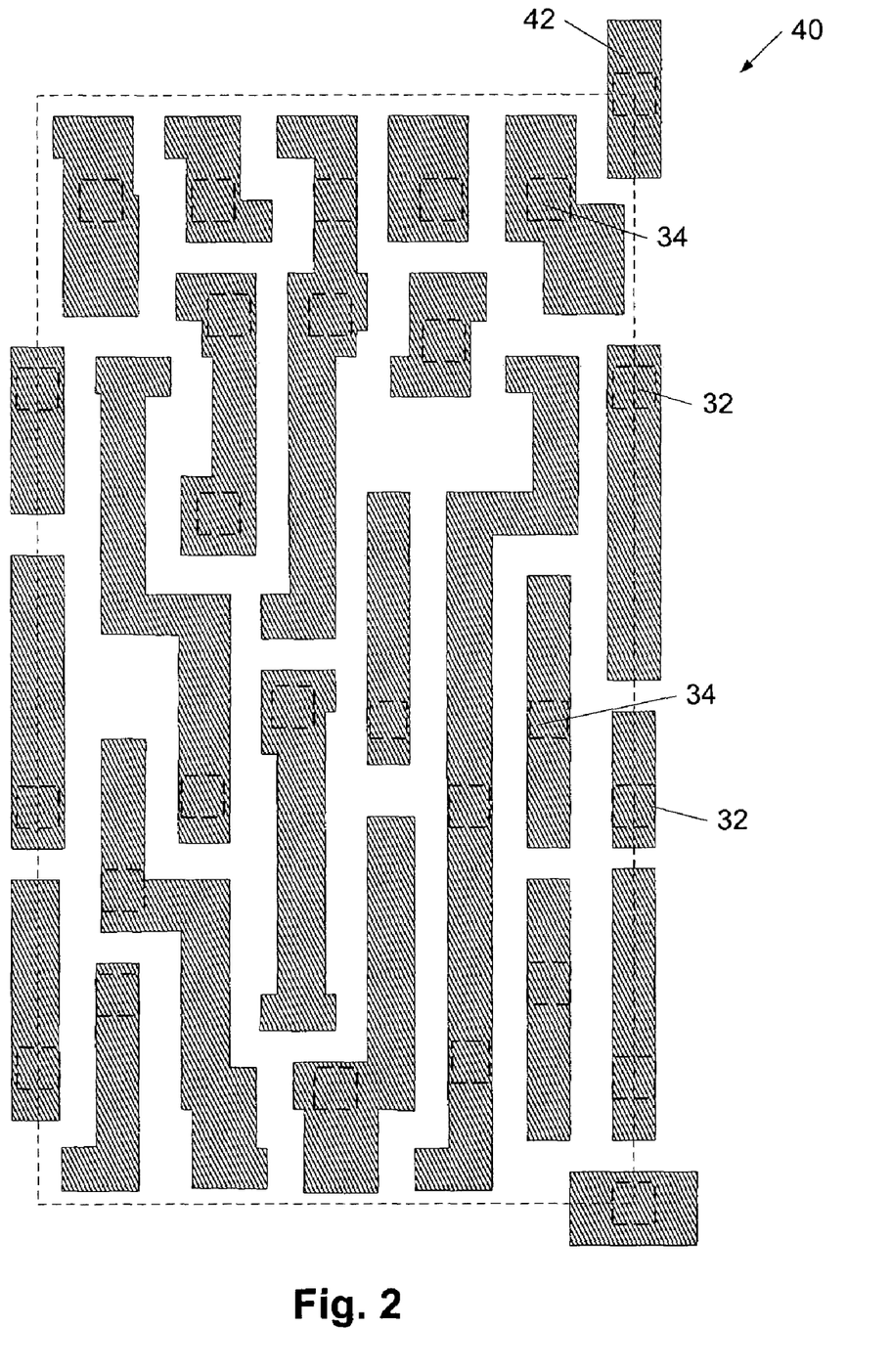
FIG. 2 depicts a top view of an intermediate fabrication cell architecture having a first metal layer formed above the basic cell architecture one of FIGS. 1a and 1b.

FIG. 2 illustrates intermediate fabrication cell 40 exhibiting an exemplary configuration of a first metal layer formed above basic cell architecture 10. The patterned metal layer is shown as cross-hatched members 42. The first layer of metal extends over diffusion upward contacts 32, gate line upward contacts 34, and a dielectric layer surrounding such contacts. Contact 32 and 34 are outlined by dotted lines to indicate their arrangement below first metal layer 42. The outline of the other components within basic cell architecture 10 has been omitted from the figure to simplify the drawing. Similar to basic cell architecture 10, the first metal layer 42 may be fixed in its geometry from cell-to-cell. The purpose of the fixed layer of first metal interconnect is to extend the conductive area laterally so as to make contact with possibly a upper-level via and second (or third) metal layers extending over that via. The second and third metal layers and vias between the first metal layer and the second metal layer, or the vias between the second metal layer and the third metal layer provide routability and, thus, configurability to elements within the cell as well as elements between cells to form a logic element or a memory cell. Although several different first metal layer configurations may be employed with basic cell architecture 10 and, therefore, the fabrication of logic and memory circuitry is not necessarily limited to the layout illustrated in FIG. 2, the configuration of first metal layer 42 has been optimized to offer a minimal amount of programmable interconnect and maximize pin-accessibility and, consequently, may be beneficial to use. In particular, first metal layer 42 is interlaced between the nodes of NMOS transistors N1-N6 and PMOS transistors P1-P6 mainly in the vertical direction.

Figure 3:
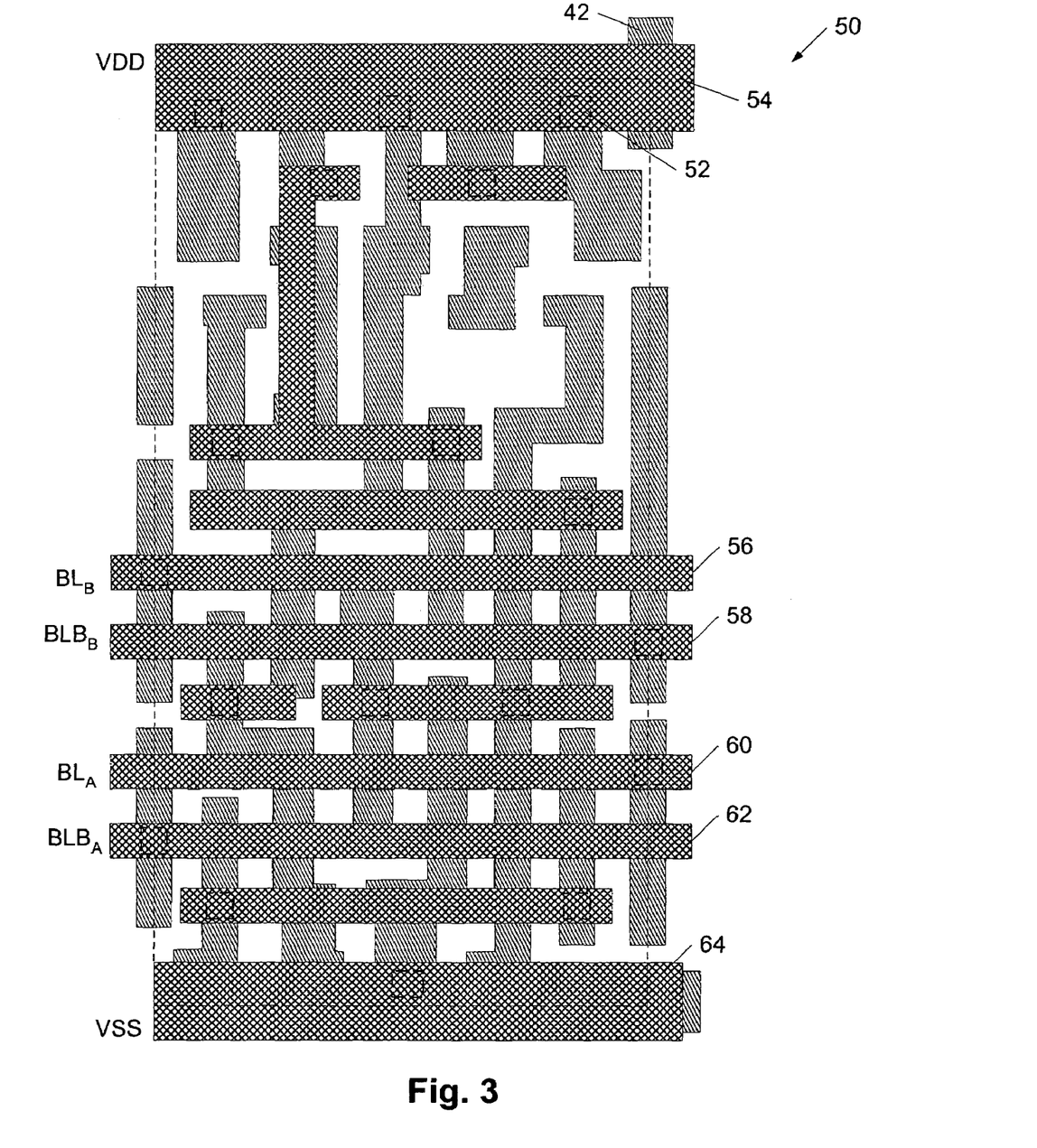
FIG. 3 depicts a top view of an intermediate fabrication cell architecture having a second metal layer formed above the intermediate fabrication cell architecture of FIG. 2.
Figure 6:
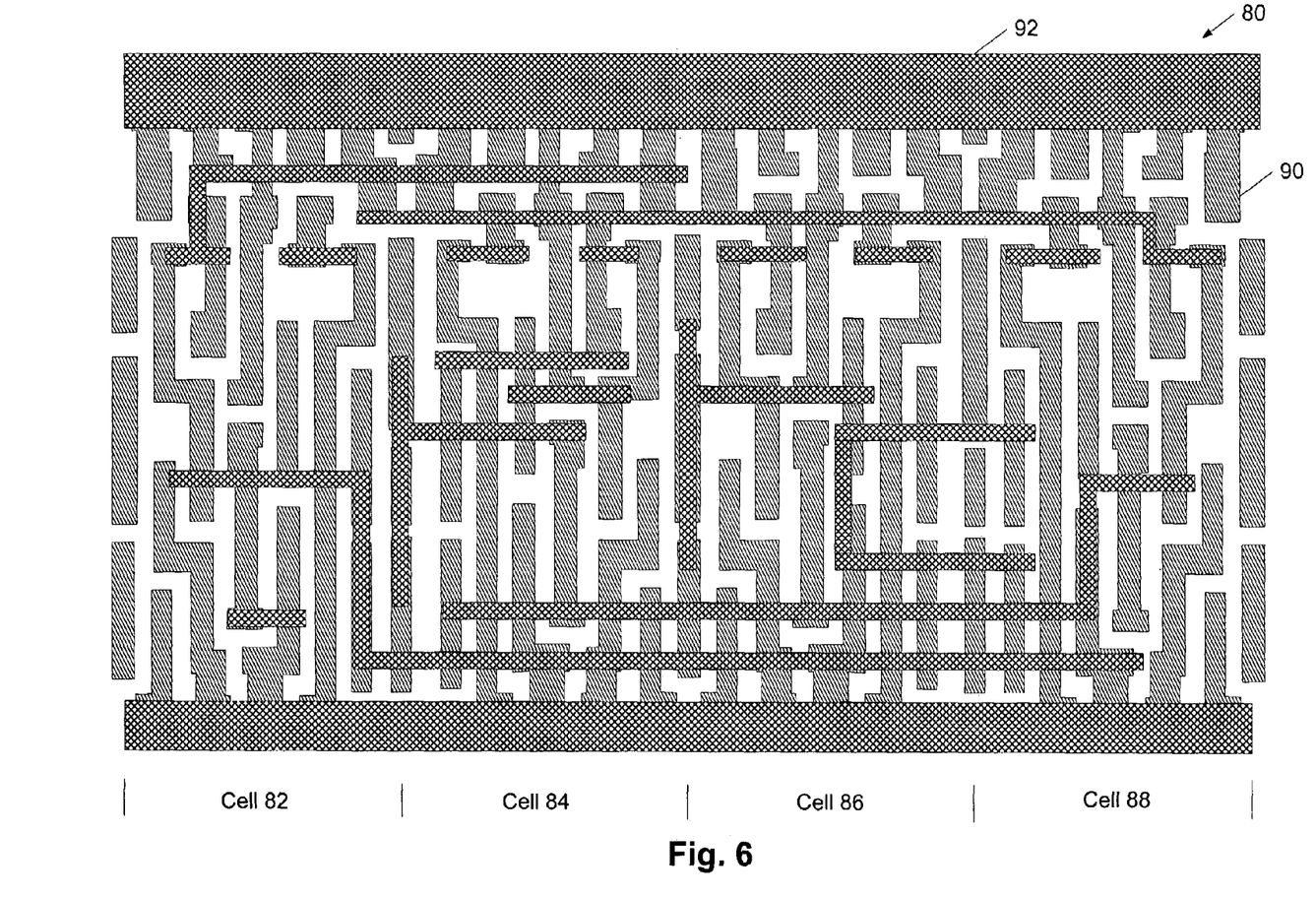
FIG. 6 depicts a top view of a flip-flop device formed from four duplicate basic cell architectures of one of FIGS. 1a and 1b.

Referring to FIG. 3, intermediate fabrication cell 50 exhibiting an exemplary configuration of a second metal layer formed above intermediate fabrication cell 40 is shown. The patterned second metal layer is shown as double cross-hatched members. The second layer of metal extends over vias 52 and a dielectric layer surrounding such contacts. Vias 52 are outlined by dotted lines to indicate their arrangement below the second metal layer. The outline of the components within basic cell architecture 10 has been omitted from the figure to simplify the drawing. As shown in FIG. 6, the second metal layer includes power supply VDD formed along conductor 54 and ground supply VSS formed along conductor 64. In addition, the second metal layer includes bit lines connected to the NMOS transistors N1-N4 to form an ensuing memory circuit or a logic circuit which employs tri-state pass devices, such as a flip-flop or a standard logic multiplexer, for example. Bit lines on the second layer of metal rather than the third layer of metal proves advantageous in reducing the bit line capacitance and adding flexibility for use of the upper layer metals, such as metal four and higher, for global routing. Furthermore, if the bit lines are employed within the third layer of metal, the memory area would have to be blocked off for global routing above the memory block leading to increased congestion for global routing. As a consequence, increased chip area would be needed to relieve the routing congestion, in turn increasing the cost of the chip.

When comparing FIGS. 1a, 2 and 3, bit line $BL_A$ connects to the drain of NMOS transistor N4 and extends across adjacent cells along conductor 60. Complementary bit line $BLB_A$ connects to NMOS transistor N3 and extends along the conductor 62. Bit line $BL_B$ connects to transistor N1 and extends along the second layer of metal through conductor 56, while bit line $BLB_B$ connects to transistor N2 and extends along conductor 58. The bit lines may extend along the second layer of metal from cell-to-cell and possibly across the entire array. Similarly, the power and supply conductors also extend from cell-to-cell and possibly along the entire array. The spacing between the true and complementary bit lines A and B is sufficient to prevent capacitive coupling of the differential logic values residing on those bit lines. In particular, $BL_A$ is spaced considerably from $BL_B$ by intervening conductors as are $BLB_A$ and $BLB_B$. Such spacing eliminates cross-talk and capacitive coupling between bit lines on separate ports. Thus, if a logic value is written to one port through $BL_A$, the present layout prevents disruption of a read on another cell via $BL_B$ due to capacitive coupling. Noting that $BL_A$ and $BL_B$ are very long and extend across many memory cells, reduction in capacitive coupling is beneficial. It is noted that the second metal layer layout of intermediate fabrication cell 50 is exemplary. Several different second metal layer configurations may be employed with basic cell architecture 10 and, therefore, the fabrication of logic and memory circuitry is not necessarily limited to the layout illustrated in FIG. 3.

Figure 4:
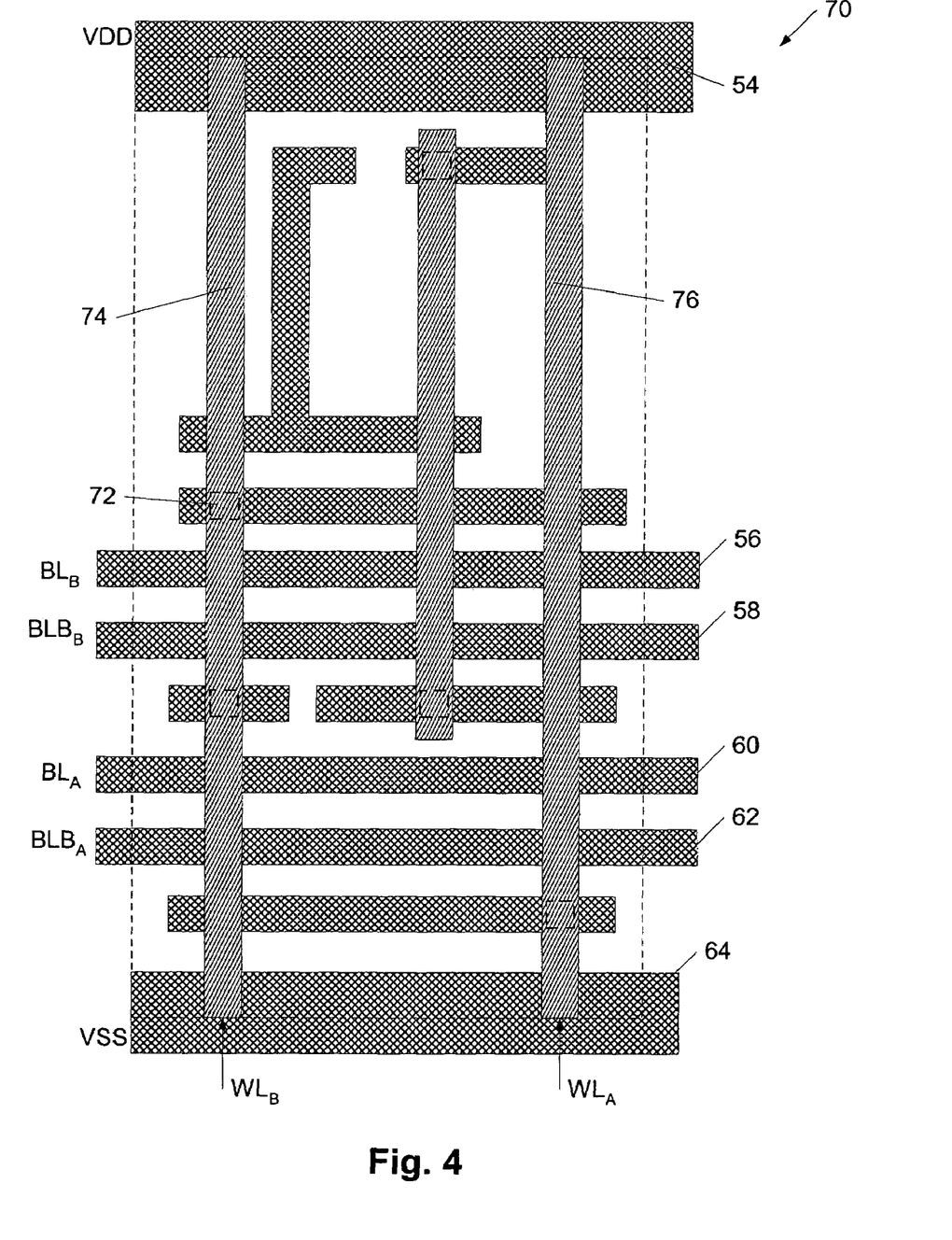
FIG. 4 depicts a top view of a SRAM cell having a third metal layer formed above the intermediate fabrication cell architecture of FIG. 3.

As shown in FIG. 4, a third layer of metal may be formed above intermediate fabrication cell 50, forming SRAM circuit 70. The patterned third metal layer is shown as cross-hatched members extending over vias 72 and a dielectric layer surrounding the contacts. Vias 72 are outlined by dotted lines to indicate their arrangement below the third metal layer. The outline of the components within basic cell architecture 10 and the outline of first metal layer 42 have been omitted from FIG. 4 to simplify the drawing. As shown in FIG. 4, the third metal layer includes wordlines $WL_A$ and $WL_B$ extending along conductors 74 and 76, respectively. As with the bit lines and power/ground supply conductors of the second metal layer, wordlines $WL_A$ and $WL_B$ may extend along the third layer of metal from cell-to-cell and possibly along the entire array. As shown in FIG. 4, wordlines $WL_A$ and $WL_B$ and other conductors of the third metal layer are formed orthogonal to the conductors of the second metal layer. In some embodiments, the conductors of the second metal layer may be specifically formed along the shorter dimension of integrated circuit cell 70 and the conductors of the third metal layer may be formed along the longer dimension as shown in FIG. 4, but the circuit is not necessarily so limited.

Figure 5:
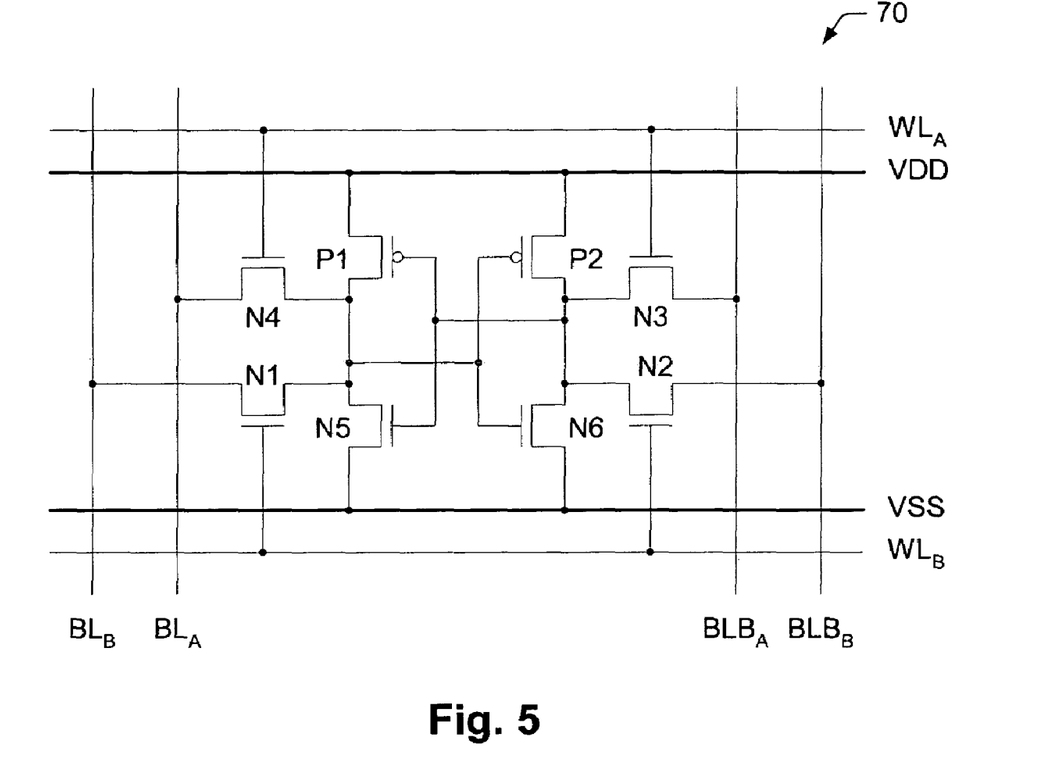
FIG. 5 depicts a circuit schematic diagram of the SRAM cell illustrated in FIG. 4.

A schematic diagram of SRAM circuit 70 is shown in FIG. 5 and is used to show the interconnections with the underlying transistors of basic cell architecture 10. As denoted in FIG. 5, wordline $WL_A$ is coupled downward through the second and first layers of metal to the gate conductors of NMOS transistors N3 and N4. Likewise, wordline $WL_B$ connects through vias of the second and first layers of metal to the gate conductors of transistors N1 and N2. PMOS transistors P1-P2 and NMOS transistors N5-N6 are shown coupled to power supply VDD and ground supply VSS to serve as pull-up and pull-down devices, respectively. PMOS transistors P3-P6 are not depicted in the schematic drawing of FIG. 5 since they are not coupled to the interconnections of the second and third metal layers and, hence, are idle in the circuit.

The schematic diagram of FIG. 5 denotes SRAM circuit 70 as a dual-port memory cell. In general, a dual-port memory cell allows two independent devices (e.g., electronic subsystems such as dual processors) to have simultaneous read and/or write access to memory cells within the same row or column. Each port of a dual-port memory cell utilizes a pair of bidirectional ports referred to as port A and port B. Respective wordlines $WL_A$ and $WL_B$ are used to access each port. Two pairs of bit lines $BL_A/BL_B$ and $BLB_A/BLB_B$ are provided for reading/writing to the nodes of the storage elements within the memory cell. The benefits of dual-port memory is more readily achieved if a layout cell can be designed that is adaptable to being configured as a dual-port memory with minimum real estate consumption as achieved with single basic cell architecture 10. It is noted that although basic cell architecture 10 is used for the formation of dual port SRAM cells, the architecture may be alternatively employed to form a single port SRAM cell. Single-port memory cells are somewhat similar to dual-port memory cells, except that each cell contains one wordline and a single pair of true and complementary bit lines.

It is noted that the third metal layer layout of SRAM circuit 70 exemplary and is not necessarily specific to the schematic diagram shown in FIG. 5. Several different third metal layer configurations may be employed with basic cell architecture 10 and, therefore, the fabrication of SRAM memory circuitry is not necessarily limited to the layout illustrated in FIG. 4. Furthermore, although FIGS. 3-5 are described specifically in reference to the formation of a SRAM cell, it is contemplated that basic cell architecture 10 may be used to form any type of memory cell that can receive written logic values and transmit read logic values that are stored in the interim. Alternative forms of memory circuitry include ROM, non-volatile cells, DRAM, etc. In yet other embodiments, basic cell architecture 10 may be used to form logic circuitry. An exemplary configuration of overlying variable layers for the formation of a flip-flop device is shown and described in more detail below in reference to FIG. 6.

Figure 7:
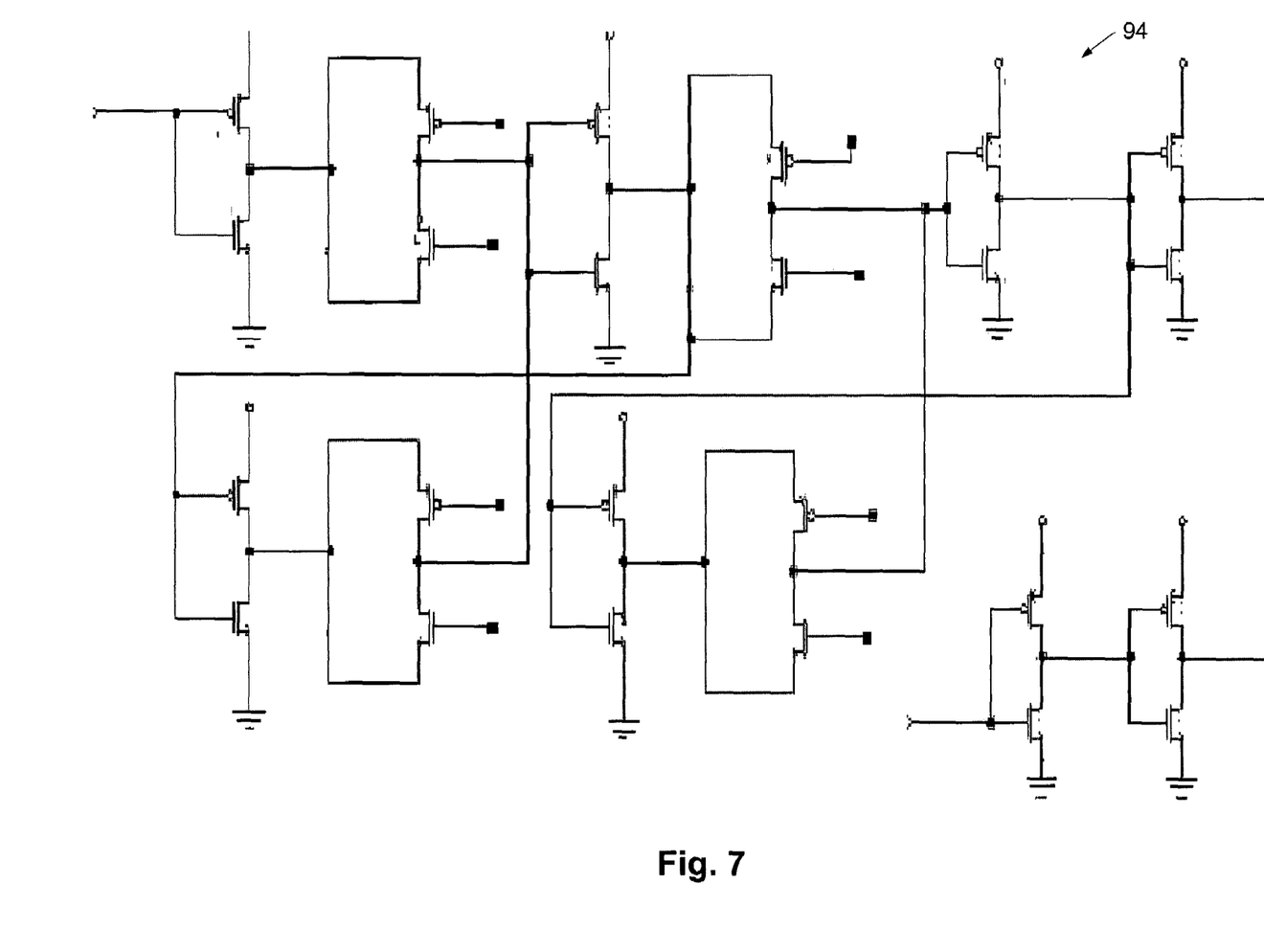
FIG. 7 depicts a circuit schematic diagram of the flip-flop device illustrated in FIG. 6.

An exemplary configuration of a flip-flop formed from four adjoining cells comprising basic cell architecture 10 is illustrated in FIG. 6. In particular, FIG. 6 illustrates flip-flop circuit 80 formed from cells 82-88. First metal layer 90 is presented by single cross-hatched members and second metal layer 92 is presented by double cross-hatched members. The components of basic cell architecture 10 have been omitted to simplify the drawing. As shown in FIG. 6, the first metal layer may be configured in the same manner as the layout shown in FIG. 2, emphasizing the point that the first metal layer may be used to fabricate logic circuitry or memory circuitry with basic cell architecture 10. The configuration of second metal layer 92, however, differs from FIG. 3 in that a flip-flop may be formed rather than a SRAM cell. It is noted that the layout of second metal layer 92 is exemplary. Several different second metal layer configurations may be employed for the fabrication of flip-flop devices or other logic circuitry and, therefore, the fabrication of logic circuitry is not necessarily limited to the layout illustrated in FIG. 6. The elements along the edge of basic cell architecture 10 and first metal layer 90 are shared between adjacent cells and, therefore, cells 84 and 88 are rotated relative to the position of basic cell architecture 10 and fixed metal layer 90 in cells 82 and 86. Thus, cells 82-88 are identical to one another, yet rotated as a reflected image of each other. A schematic diagram a flip-flop device having the architecture depicted in FIG. 6 is illustrated in FIG. 7 as circuit 94. As shown in FIG. 7, 24 transistors are employed in the circuit and, therefore, all of the NMOS transistors and PMOS transistors from basic cell architecture 10 are employed in each cell. It is noted that circuit 94 is not limited to the configuration illustrated in FIG. 6.

It will be appreciated to those skilled in the art having the benefit of this disclosure that this invention is believed to provide a structured ASIC circuit architecture having plurality of cells with fixed transistors configurable for the formation of logic devices and/or single/dual port memory devices. Further modifications and alternative embodiments of various aspects of the invention will be apparent to those skilled in the art in view of this description. It is intended that the following claims be interpreted to embrace all such modifications and changes and, accordingly, the specification and drawings are to be regarded in an illustrative rather than a restrictive sense.

What is claimed is:

1. A circuit architecture comprising an array of cells, wherein an individual cell comprises:
   a first set of NMOS transistors; and
   a second set of NMOS transistors comprising greater gate widths than the first set of NMOS transistors, with at least one of the first and second sets of NMOS transistors comprising substantially equal proportions of gate width versus gate length, wherein a ratio of the average drive currents of the second set of NMOS transistors to the average drive currents of the first set of transistors is at least approximately 6.0.

2. The circuit architecture of claim 1, wherein the ratio is between approximately 6.0 and approximately 7.0.

3. The circuit architecture of claim 1, wherein the ratio is between approximately 7.0 and approximately 8.0.

4. The circuit architecture of claim 1, wherein at least one of the first and second sets of NMOS transistors comprise substantially equal gate widths.

5. The circuit architecture of claim 1, wherein the individual cell further comprises a
   first set of PMOS transistors; and
   a second set of PMOS transistors comprising greater widths than the first set of PMOS transistors.

6. The circuit architecture of claim 1, further comprising circuitry arranged above at least a portion of the array of cells which forms logic devices.

7. The circuit architecture of claim 1, further comprising circuitry arranged above at least a portion of the array of cells which forms memory devices.

8. The circuit architecture of claim 7, wherein the circuitry forms a dual port memory devices within at least some of the individual cells.

9. A circuit architecture comprising an array of cells, wherein an individual cell comprises:
   a first set of NMOS transistors; and
   a second set of NMOS transistors comprising greater gate widths than the first set of NMOS transistors, wherein the first set of NMOS transistors comprise diffusion regions with a higher net concentration of electrically active dopants than the second set of NMOS transistors such that the first set of NMOS transistors have a higher threshold voltage than the second set of NMOS transistors, and wherein a ratio of the average drive currents of the second set of NMOS transistors to the average drive currents of the first set of transistors is at least approximately 6.0.

10. The circuit architecture of claim 9, wherein the ratio is between approximately 6.0 and approximately 7.0.

11. The circuit architecture of claim 9, wherein the ratio is between approximately 7.0 and approximately 8.0.

12. The circuit architecture of claim 9, wherein at least one of the first and second sets of NMOS transistors comprise substantially equal gate widths.

13. The circuit architecture of claim 9, wherein the individual cell further comprises a
   first set of PMOS transistors; and
   a second set of PMOS transistors comprising greater widths than the first set of PMOS transistors.

14. The circuit architecture of claim 9, further comprising circuitry arranged above at least a portion of the array of cells which forms logic devices.

15. The circuit architecture of claim 9, further comprising circuitry arranged above at least a portion of the array of cells which forms memory devices.

16. The circuit architecture of claim 15, wherein the circuitry forms a dual port memory devices within at least some of the individual cells.

* * * * *